Patented Oct. 29, 1929

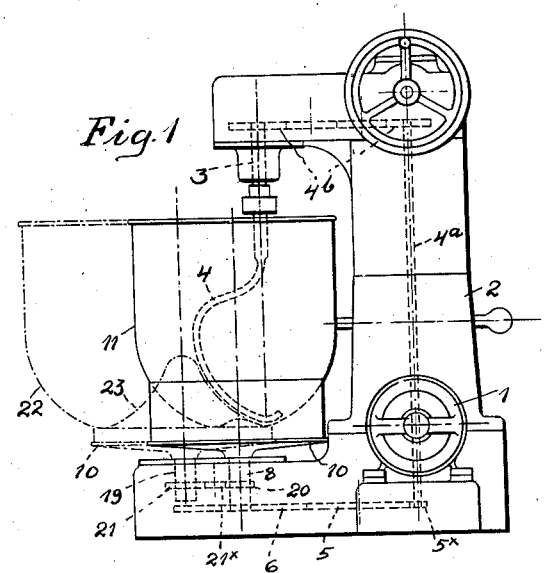
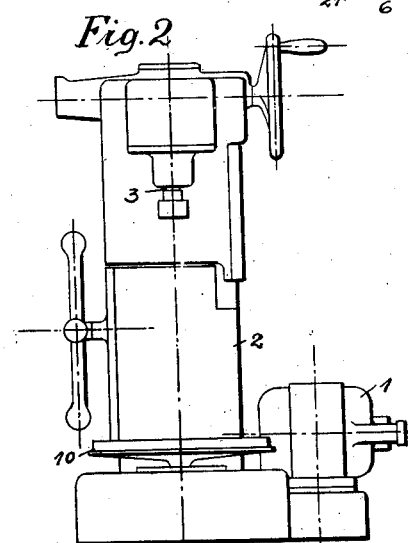
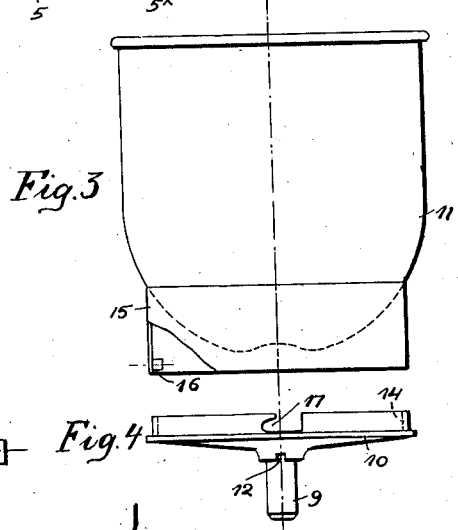
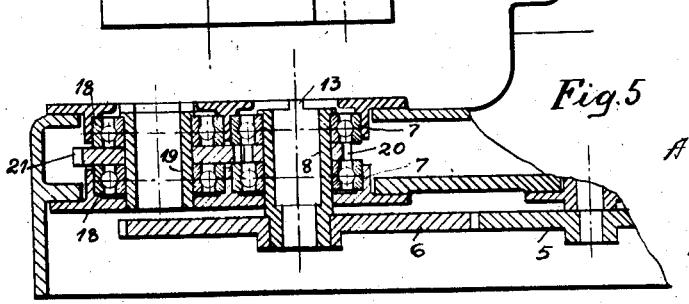

1,733,291

UNITED STATES PATENT OFFICE

AXEL VALDEMAR AASTRUP, OF STOCKHOLM, SWEDEN

KNEADING AND WHIPPING MACHINE

Application filed October 31, 1927, Serial No. 230,141, and in Germany September 30, 1927.

This invention relates to a machine for kneading dough, working forcement, whipping and similar operations, which is so arranged, that two (or more) vessels of different widths may be mounted respectively in the same machine while the same effective working of the goods along the inner side of the preferably rotating vessel is retained. This is rendered possible through the provision of two (or more) spindles or the like for carrying the different vessels, which spindles are located at different distances from the axis of rotation of the working implement.

In the accompanying drawing a machine arranged in accordance with the invention is shown as an example, said machine being adapted to two vessels of different widths. Fig. 1 is a side view of the machine and Fig. 2 is an end view of the same. Fig. 3 shows in a side view one of the vessels. Fig. 4 shows a disk for supporting the vessel mounted in the machine. Fig. 5 shows in a vertical section two rotatable spindles or studs together with a toothed gearing for rotating the vessels of the one and the other width.

The machine shown in the drawing is driven by an electric motor 1, from which motion is transmitted to the spindle 3 carrying the working implement 4 by means of a vertical shaft $4^a$, which is journaled in the frame of the machine and between which and the shaft of the motor a mitre gear (not shown) is provided, and a toothed gearing $4^b$, illustrated only diagrammatically in Fig. 1. From the vertical shaft $4^a$ motion is transmitted by means of a toothed gearing $5^x$, 5, 6 in the base of the machine to a spindle 8 journaled in ball bearings 7 provided in the said base. The said spindle 8 is sleeve shaped and is adapted to receive the stud 9 of a disk, on which the vessel 11 may be placed. In the lower side of the disk 10 a notch 12 is provided, which at the mounting of the disk on the sleeve 8 engages a projection 13 on the sleeve, so that the disk is locked to the sleeve and caused to rotate with the same. A flange 14 is provided at the top side of the disk 10 on which the vessel 11 is slid by means of a circular flange 15 provided at its bottom side. At the inner side of the said flange 15 a pin 16 is provided, which at the mounting of the vessel on the disk 10 engages a notch 17 provided in the flange 14 and widened inwards, whereby the vessel is locked to the disk and is caused to rotate with the same. Two or more pins may be provided on the flange 15 engaging corresponding notches in the flange 14.

The distance of the spindle 8 from the center line of the spindle 3 is so adapted with relation to the vessel 11, that the implement 4 works the goods along the inner side of the wall of the vessel and close to the same, the most effective working being thereby gained.

In order now to render possible the mounting into the machine of a second vessel having a greater width and volume a second sleeve shaped spindle 19 is journaled in ball bearings 18 provided in the base of the machine, said spindle being constructed in the same manner as the spindle 8. The said spindle 19 is rotated by the spindle 8 by means of a toothed gearing, comprising two toothed wheels 20 and 21 and an intermediate toothed wheel $21^x$. As the wider vessel 22, shown by dotted lines in Fig. 1 and arranged in the same manner as the vessel 11, should be used, the disk 10 is mounted with its stud 9 into the sleeve 19 and locked to the same. The wider vessel 22 is then placed on the disk 10 and locked to the same, see the dotted lines in Fig. 1.

The distance of the spindle 19 from the center line of the implement is so adapted, that also in this case the implement works the goods along the inner side of the vessel and close to the same. At the bottom of the vessel 22 a projection 23 may be provided which renders the working more effective. Through the toothed gearing 20, 21, $21^x$ the spindle 19 for the wider vessel 22 will be rotated at a lower rate than the spindle 8 for the vessel 11 or at a velocity which is adapted to the goods to be worked in the greater vessel. The vessels are rotated in such direction, that the goods mounted in the same meet the implement while moving close to the wall of the vessel.

Consequently, through the described provision of two driving spindles it is possible to mount in a machine, constructed for the narrower vessel, also a wider vessel. This is an advantage, because hereby the procuring of a machine arranged for the wider vessel may be dispensed with. The machine may, evidently, be provided with a third spindle for a still wider vessel.

I claim:

1. In a machine for kneading dough, whipping and similar operations the combination of a frame, a spindle journaled in the frame and adapted to carry the working implement, a plurality of spindles journaled in the said frame laterally of each other and at such distances from each other, that vessels of different widths may be carried by the spindles in proper position with relation to the implement, a disk for supporting the vessels, a device loosely connecting the disk to the spindles carrying the vessels, and means for rotating the spindles.

2. In a machine for kneading dough, whipping and similar operations the combination of a frame, a spindle journaled in the frame and adapted to carry the working implement, a plurality of sleeve shaped spindles journaled in the said frame laterally of each other and at such distances from each other, that vessels of different widths may be carried by the spindles in proper position with relation to the implement, a disk for supporting the vessels, said disk having a stud adapted to be slid into the said sleeve shaped spindles, a pin and notch coupling between the disk and the said spindles, and means for rotating the spindles.

3. In a machine for kneading dough, whipping and similar operations the combination of a frame, a spindle journaled in the frame and adapted to carry the working implement, means for rotating the said spindle, and a plurality of holders for vessels of different widths, said holders being located in the said frame and laterally of each other and at a distance from each other adapted to the difference between the widths of the vessels.

4. In a machine for kneading dough, whipping and similar operations the combination of a frame, a spindle journaled in the same and adapted to carry the working implement, means for rotating the said spindle, and a plurality of spindles disposed in the said frame laterally of each other and at a distance from each other adapted to the difference between the widths of the vessels.

In testimony whereof I have hereunto affixed my signature.

AXEL VALDEMAR AASTRUP.